April 24, 1951
E. A. KEHOE ET AL
2,550,567
PLASTIC CAP MAKING APPARATUS
Filed May 6, 1948
3 Sheets-Sheet 1
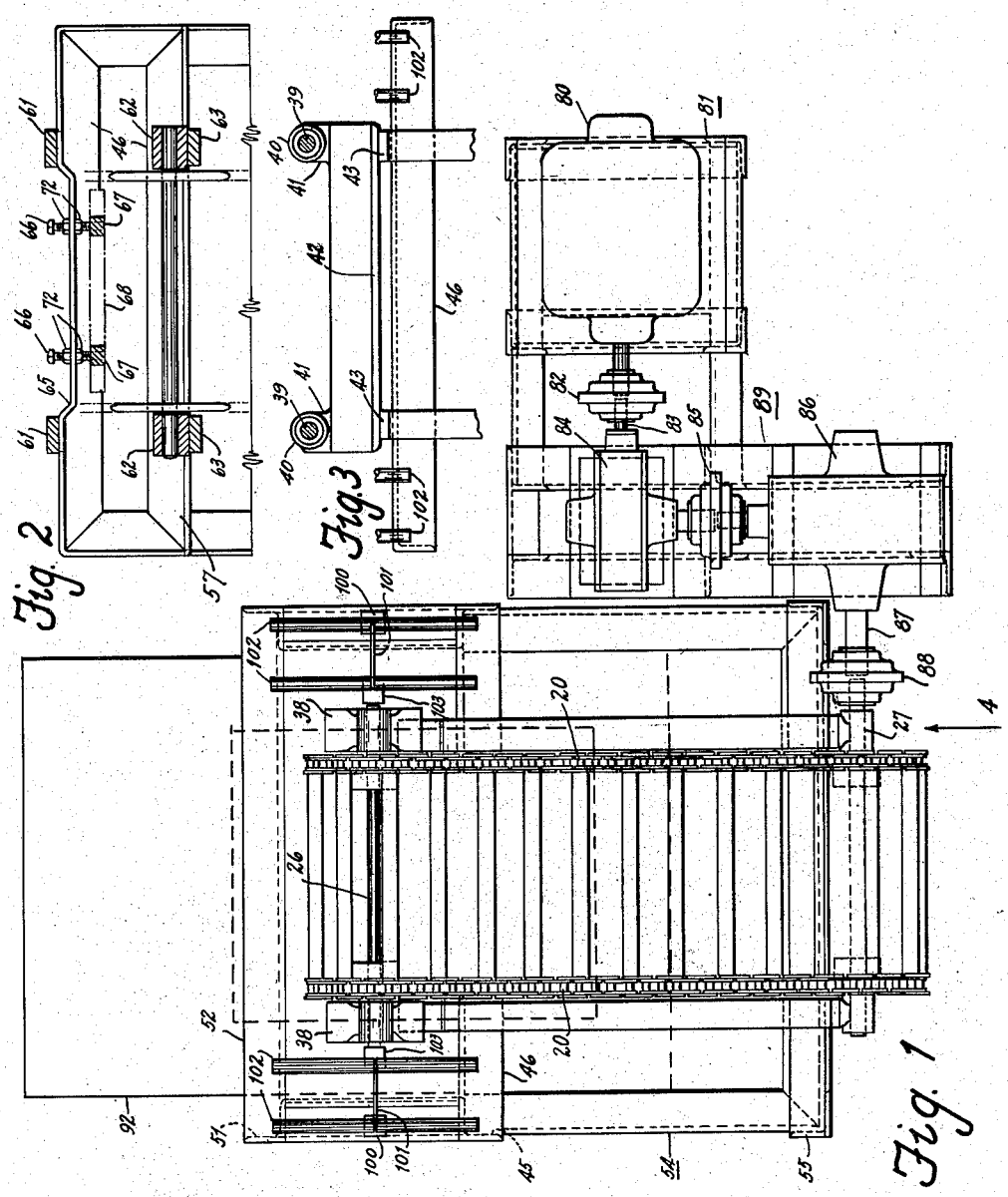
INVENTORS
Ellsworth A. Kehoe
BY Theodore R. Burr
Spencer Hardman & Fehr
their attorneys

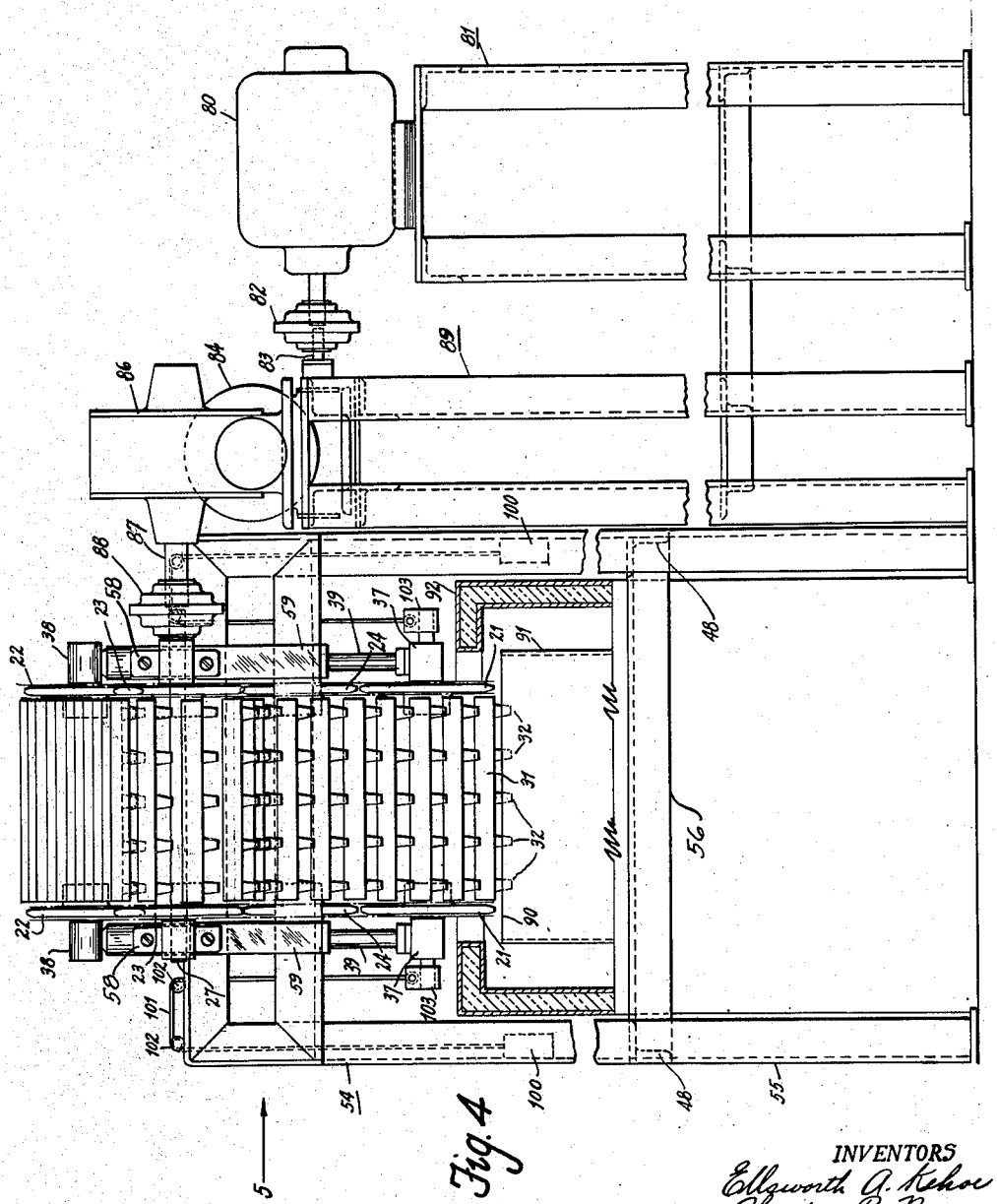

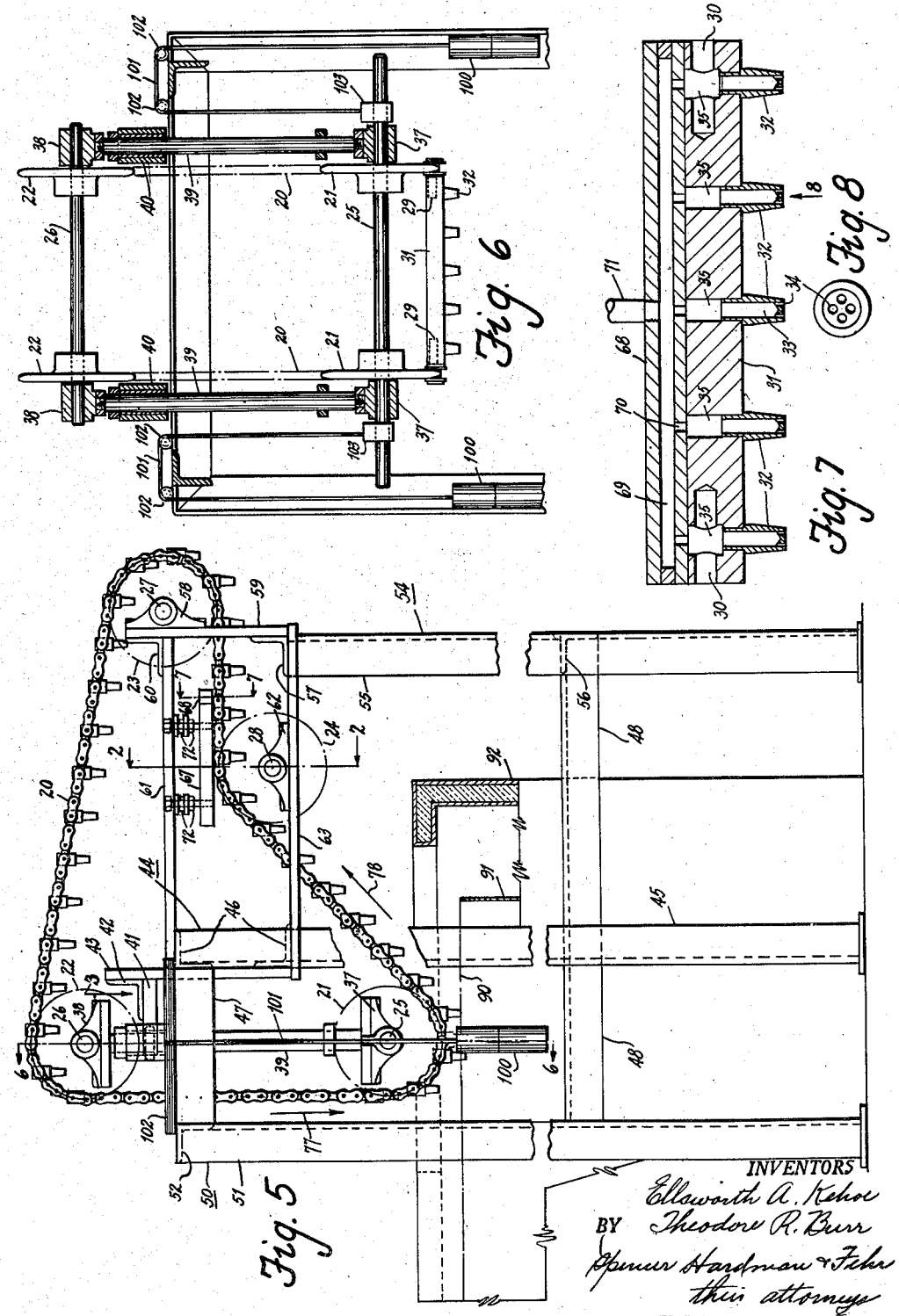

Patented Apr. 24, 1951

2,550,567

UNITED STATES PATENT OFFICE 2,550,567

PLASTIC CAP MAKING APPARATUS

Ellsworth A. Kehoe and Theodore R. Burr, Rochester, N. Y., assignors to General Motors Corporation, Detroit, Mich., a corporation of Delaware Application May 6, 1948, Serial No. 25,494

5 Claims. (Cl. 18—24)

This invention relates to apparatus for forming plastic thimbles adapted to protect metal parts, such as threaded bushings, which are assembled with tubing.

An object of the invention is to provide a machine which will make thimbles from air curing plastic. The machine is adapted to be used with a tank containing air curing plastic and comprises a continuously moving conveyor having bars supporting thimble forms which are submerged successively in the plastic which adheres to the thimble forms as they are withdrawn from the plastic. The forms being moved by the conveyor through surrounding air which cures the adhering plastic to form thimbles. Each bar and the thimble forms supported thereby provides passages for receiving compressed air which is admitted to the bars successively in order to blow the thimbles from the forms.

Further objects and advantages of the present invention will be apparent from the following description, reference being had to the accompanying drawings wherein a preferred embodiment of the present invention is clearly shown.

In the drawings:

Fig. 1 is a plan view of the thimble-forming machine;

Fig. 2 is a fragmentary sectional view on line 2—2 of Fig. 5;

Fig. 3 is a fragmentary view in the direction of arrow 3 of Fig. 5;

Fig. 4 is a front view in the direction of arrow 4 of Fig. 1;

Fig. 5 is a side view in the direction of arrow 5 of Fig. 4;

Figs. 6 and 7 are sectional views taken respectively on lines 6—6 and 7—7 of Fig. 5, Fig. 7 being drawn to a larger scale;

Fig. 8 is a view in the direction of arrow 8 of Fig. 7.

Referring to Fig. 5, the conveyor comprises two chains 20 which pass around pairs of sprockets 21, 22, 23, 24 supported respectively by shafts 25, 26, 27, 28 and which provide spaced trunnions 29 (Fig. 6) which are received in sockets 30 (Fig. 7) of bars 31. Each bar 31 supports a plurality of thimble-forms 32, each having a central passage 33 connected with a plurality of small outlet holes 34; and each central passage 33 is in communication with a passage 35 provided by the bar 31. Referring to Fig. 6, shafts 25 and 26 are journaled in bearing brackets 37 and 38, respectively, which are attached to the ends of rods 39 which are supported by vertical movement by sleeves 40 which are attached to a plate 41 which an angle 42 attaches to two plates 43. Plates 43 are supported by a vertical frame 44 comprising vertical angle bars 45 and horizontal angle bars 46. The vertical frame 44 is connected by angle bars 47 and 48 with another vertical frame 50 comprising vertical angle bars 51 and an horizontal bar 52. Frames 44 and 50 are connected by angle bar 48 (see also Fig. 4) with a third upright frame 54 comprising vertical angle bars 55 and horizontal angle bars 56 and 57.

Shaft 27 is supported by bearing brackets 58 which are attached to two bars 59, the lower portions of which are attached to angle bar 57 and the upper portions of which are attached to an angle bar 60 attached to two bars 61 attached to the upper angle bar 46 of frame 44.

The sprocket shaft 28 (Fig. 2) is supported by brackets 62 attached to two bars 63 attached to angle bar 57 of frame 54 and to lower angle bar 46 of frame 44. Bars 61 support bars 65 which having plain holes receiving screws 66 attached to bars 67 integral with a bar 68 (Figs. 5 and 7) providing a compressed air manifold including a passage 69 connected with branch passages 70 and with a hose 71 connected with a compressed air source. Nuts 72 are adjustable on screws 66 for the purpose of locating the bar 68 so that it will be firmly engaged by the bars 31 as they are moved successively into engagement with bar 68 by the conveyor.

The conveyor chains 20 are moved in the direction of arrows 77 and 78 (Fig. 5) by an electric motor 80 mounted on a frame 81 and connected by a coupling 82 with the input shaft 83 of a speed reducer in a case 84 and connected by a coupling 85 with a speed reducer in a case 86 and having its shaft 87 connected by a coupling 88 with shaft 27. Frame 89 supports gear reducer housings 84 and 86. The thimbles are moved successively (five at a time) below the surface indicated by line 90 of heated air curing plastic which is kept in circulation by means, not shown, and overflows a weir 91 and thence into a heat insulated tank 92. As the thimble forms, coated with the plastic, move in the direction of arrow 78, the plastic adhering to the forms cures or sets to form thimbles which are blown off whenever the form is subjected to compressed air which occurs when the bar 31 supporting them passes under the air manifold bar 68.

To facilitate access to the tank 92, it is desirable to elevate the conveyor. This is accomplished by moving the rods 39 upwardly thereby moving the sprockets 21 and 22 and portions of the chains 20. As shown in Fig. 6, the weight of sprocket shaft 25 and parts supported thereby is counterbalanced by weights 100 connected by cables 101 passing over rods 102 and attached to sleeves 103 surrounding the shaft 25. When the sprockets 21 and 22 are raised the chains 20 remain in mesh with all the sprockets and do not sag down to interfere with ready access to the region immediately above the tank 92. This result is accomplished by the novel arrangement of the sprockets 21, 22, 23 and 24 as shown in Fig. 5.

The plastic compound and the equipment for containing, circulating and heating it are not per se parts of the present invention. The plastic compound which may be used with the present invention may be any one of a number of available air curing plastics for example, a solution of ethyl cellulose in a suitable plasticiser.

While the embodiment of the present invention as herein disclosed, constitutes a preferred form it is to be understood that other forms might be adopted, all coming within the scope of the claims which follow.

What is claimed is as follows:

1. Apparatus for making thimbles from liquid plastic material, a coating of which cures quickly in air, said apparatus comprising a conveyor, means for moving the conveyor continuously, a frame for supporting the conveyor above a vessel containing the material; hollow thimble forms having holes in their bottom surfaces and moved by the conveyor into and out of liquid plastic material to form a coating on the sides and bottoms of the forms, said coating setting during movement of the forms from the plastic containing vessel; a manifold including passages spaced from the vessel; and means for applying compressed air to the manifold whereby when the forms pass the manifold the air will blow the set plastic thimbles from the forms.

2. Apparatus for making thimbles from liquid plastic material, a coating of which cures quickly in air, said apparatus comprising a tank for receiving the material; a hollow form to which a coating of plastic is applied; means of conducting compressed air to the interior of the form to eject the coating in the shape of a thimble from the form, said means comprising a movable form holder having a duct connected with the interior of the form; a fixed plate spaced from the tank with which the holder is brought into engagement after the form supported thereby has received a coating of material which has been cured in air, said plate having a duct connected with a compressed air source and with which the duct in the holder communicates during a portion of movement of the holder; and a continuously moving conveyor for carrying the holder into positions for causing the submersion of the form into and out of the material and for causing it to pass through air to effect curing of the coating received by the form and for causing the holder to engage the fixed plate.

3. Apparatus for making thimbles from liquid plastic material, a coating of which cures quickly in air, said apparatus comprising a tank for receiving the material; bars from each of which a plurality of thimble forms are suspended each bar having passages connected with the interior of the forms and extending to the upperside of the bars; a fixed manifold spaced from the tank, said manifold having a duct connected with a compressed air source and providing openings communicating with the duct and aligned with bar passages when the bars engage the underside of the manifold; a continuously moving chain conveyor for moving the bars for causing the forms to dip into and out of the material to form a coating on the lower ends of the forms, and for causing the forms to pass through air to effect setting of the coating received by the forms and causing the holders to engage the manifold; first, second, third, and fourth pairs of sprockets for supporting the conveyor chain above the tank, said sprockets being so arranged that the axes of the sprockets are in parallel relation, the axes of first and second pairs of sprockets being in vertical alignment directly above the tank and the axes of the third and fourth pairs of sprockets being at levels between the levels of the axes of the first and second pair of sprockets, said axis of the third pair of sprockets being at a level nearer to the level of the second pair of sprockets than the axis of the four pair of sprockets, said axis of the third pair of sprockets being spaced a greater distance from the vertical plane of the axes of the first and second pairs of sprockets than the axis of the fourth pair of sprockets; and a vertical adjustable support for the first and second pairs of sprockets to raise said sprockets to provide access to the region above the tanks by elevating the first and second pairs of sprockets, said arrangement of sprockets being such that the chain will remain, during adjustment, in mesh with all the sprockets and any sag in the chains does not interfere with the ready access to said region above the tank, the fourth pair of sprockets being directly below the fixed manifold to place the bars successively in contact with the manifold.

4. Apparatus for applying a coating of liquid to objects, said apparatus comprising a tank for receiving the coating liquid; supports for the objects to be coated; a chain conveyor for moving the supports to carry the objects into and out of the tank; first, second, third and fourth sprockets for supporting the chain conveyor above a vessel containing the coating liquid, said sprockets being so arranged that the axes of the sprockets are in parallel relation, the axes of the first and second sprockets being in vertical alignment and directly above the tank and the axes of the third and fourth sprocket being at levels between the levels of the axes of the first and second sprockets, said axis of the third sprocket being at a level closer to the level of the second sprocket than the axis of the fourth sprocket, said axis of the third sprocket being further from the vertical plane of the axes of the first and second sprockets than the axis of the fourth sprocket; and a vertically adjustable support for the first and second sprockets to provide access to the region above the tank by elevating the first and second sprockets while the chain remains in engagement with all the sprockets.

5. Apparatus for making thimbles from liquid plastic material, a coating of which cures quickly in air, said apparatus comprising, a tank for receiving the material, plates from which a plurality of hollow thimble forms are suspended each plate having passages connected with the interior of the forms and extending to the upper side of the plate; a fixed manifold spaced from the tank, said manifold having a duct connected with a compressed air source and providing openings communicating with duct and aligned with the plate passages when the plates engage the underside of the manifold for conducting compressed air to the interior of the forms to eject the coating in the form of thimbles; a continuously moving double endless conveyor for moving the plates for causing the forms to dip into and out of the material to form a coating on the lower ends of the forms and for causing the forms to pass through air to effect curing of the coating received by the forms and causing the plates to engage the manifold, said plates being pivotally supported on the chains of the conveyors so that the center of the mass of each plate and its forms is below the pivotal points of the plate so that center of the mass and the pivotal points will be in vertical alignment causing the upper edges of all coatings on their respective forms to be symmetrical and for causing the upper side of the plate to be on a horizontal plane as the plates engage the under side of the manifold.

ELLSWORTH A. KEHOE.
THEODORE R. BURR.

REFERENCES CITED

The following references are of record in the file of this patent:

UNITED STATES PATENTS

| Number | Name | Date |
| --- | --- | --- |
| Re. 22,631 | Fingado | Apr. 17, 1945 |
| 2,090,528 | Ferngren | Aug. 17, 1937 |
| 2,121,721 | Welker | June 21, 1938 |
| 2,217,213 | Bratring | Oct. 8, 1940 |